United States Patent
Gopal et al.

(10) Patent No.: US 8,745,127 B2
(45) Date of Patent: Jun. 3, 2014

(54) BLENDING SINGLE-MASTER AND MULTI-MASTER DATA SYNCHRONIZATION TECHNIQUES

(75) Inventors: Burra Gopal, Redmond, WA (US); Chris Keyser, Snoqualmie, WA (US); Rolando Jimenez Salgado, Redmond, WA (US); Rakesh Gupta, Hyderabad (IN); Manish Soni, Hyderabad (IN); David Koronthaly, Sammamish, WA (US); Anton Kirillov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 12/119,504

(22) Filed: May 13, 2008

(65) Prior Publication Data
US 2009/0287762 A1 Nov. 19, 2009

(51) Int. Cl.
*G06F 15/16* (2006.01)
(52) U.S. Cl.
USPC ........... 709/203; 709/204; 709/205; 707/624; 707/695; 707/687
(58) Field of Classification Search
USPC ............. 709/203, 248, 225; 707/200, 999.01, 707/999.2, 999.02
See application file for complete search history.

(56) References Cited

U.S. PATENT DOCUMENTS

| 6,901,380 | B1 | 5/2005 | Bremers | |
|---|---|---|---|---|
| 6,904,491 | B2 * | 6/2005 | Waldman et al. | 711/101 |
| 7,492,746 | B2 * | 2/2009 | Hossain et al. | 370/338 |
| 2002/0013827 | A1 * | 1/2002 | Edstrom et al. | 709/219 |
| 2004/0034661 | A1 | 2/2004 | Barron et al. | |
| 2004/0117386 | A1 * | 6/2004 | Lavender et al. | 707/100 |
| 2004/0260670 | A1 * | 12/2004 | Tokimitsu et al. | 707/1 |
| 2005/0034054 | A1 * | 2/2005 | Tsuyama et al. | 715/500 |
| 2005/0054445 | A1 * | 3/2005 | Gatto et al. | 463/42 |
| 2005/0071839 | A1 * | 3/2005 | Kim et al. | 717/170 |
| 2005/0235018 | A1 | 10/2005 | Tsinman et al. | |
| 2006/0136517 | A1 * | 6/2006 | Creamer et al. | 707/204 |
| 2006/0167838 | A1 * | 7/2006 | Lacapra | 707/2 |
| 2006/0195460 | A1 | 8/2006 | Nori et al. | |
| 2006/0242204 | A1 | 10/2006 | Karas et al. | |
| 2007/0005906 | A1 * | 1/2007 | Miyamoto | 711/143 |
| 2007/0043691 | A1 * | 2/2007 | S | 707/1 |
| 2007/0067354 | A1 * | 3/2007 | Mullender et al. | 707/201 |
| 2007/0097923 | A1 * | 5/2007 | Chaudry et al. | 370/332 |
| 2007/0100845 | A1 * | 5/2007 | Sattler et al. | 707/100 |

(Continued)

OTHER PUBLICATIONS

"Duet for Microsoft Office and SAP"—Microsoft, Jun. 2006.*

(Continued)

*Primary Examiner* — Randy Scott (57) ABSTRACT

Architecture that maintains the user experience as close as possible to the user experience when dealing with the usual/regular forms and data provided in an office application when dealing with hybrid forms and hybrid data. Synchronization of the hybrid data to single-master and multi-masters systems is accomplished when the associated hybrid client goes offline, changes are made to the hybrid data, and then the client comes back online. For example, where the single-master system is a line-of-business (LOB) server system and the multi-master system is an officer server that employs collaboration capability, the architecture allows office users to access, manipulate, and share LOB entity information using collaborative means, while at the same time, ensuring data and business process consistency for the LOB entity in the LOB system.

20 Claims, 8 Drawing Sheets

(56) References Cited

U.S. PATENT DOCUMENTS

| | | | |
|---|---|---|---|
| 2007/0143421 A1* | 6/2007 | Vuong et al. | 709/206 |
| 2007/0219976 A1 | 9/2007 | Muralidhar et al. | |
| 2007/0299679 A1 | 12/2007 | Sudan et al. | |
| 2008/0201354 A1* | 8/2008 | Abel et al. | 707/102 |
| 2008/0208806 A1* | 8/2008 | Dalfo et al. | 707/3 |

OTHER PUBLICATIONS

"Integrating LOB Systems with the Microsoft Office System"—Microsoft, Nov. 2007.*

"Getting Started with Office Business Applications (Part 2 of 2)", 7 Microsoft Office Business Applications for Office SharePoint Server 2007, Microsoft Press, 2007.

Ravindran, "Integrating LOB Systems with the Microsoft Office System", Nov. 2007, Microsoft Corporation.

"Duet for Microsoft Office and SAP; Microsoft Planning Guide", Version 1.0, Jun. 2006, Microsoft Corporation.

"Epicor Information Worker", Sep. 19, 2006, Microsoft Corporation.

Norwood, "Office Business Application Extends Reach and Value of Epicor Enterprise Solutions", Mar. 2007, Microsoft Corporation.

* cited by examiner

BLENDING SINGLE-MASTER AND MULTI-MASTER DATA SYNCHRONIZATION TECHNIQUES

BACKGROUND

Software vendors develop suites of applications for the purpose of providing a common user experience (UX) across a multiple applications and associated software functionality to a large set of users. However, corporations will have many different software requirements to handle human resources, financials, products, line-of-business (LOB) information, and so on.

It can be desirable to extend the common UX into the business realm by allowing LOB information and processes to be surfaced within the familiar UX of the office suite. This introduces other problems, however, particularly when handling data in offline scenarios, which oftentimes can occur when users travel, for example.

In a purely pessimistic offlining model, data about to be modified is locked and then unlocked after modification, which captures how typical on-line transaction processing (OLTP) systems behave. Alternatively, an optimistic offlining (and concurrency) model does not lock the data prior to the user making modifications.

In optimistic offlining in LOB systems, the LOB data and processes can be made available to the end-user in a local datastore while offline. When back online, the offline changes are seamlessly integrated with the LOB system, and any relevant changes in the LOB system are seamlessly integrated into the local datastore.

However, there are many limitations in the optimistic model. For example, there can be conflicting changes made by two different users while offline, which then need to be reconciled when both user systems are back online, the user could be dealing with out-of-date data while offline, the user's operations could be rejected (when back online) long after the operations are fired by the user (when previously offline), etc.

In contrast, there can be advantages of optimistic model. The model is resilient to connectivity issues, and changes coming in from multiple sources can be handled at the same time (referred to as "multiple-masters of data"). Additionally, the optimistic model works well when dealing with personal information (since conflicts in that case will only be with the user's own changes, which is very rare, e.g., user errors, out-of-date clients, data corruptions, etc., all of which are true exceptions), and the model works well when dealing with information that users explicitly collaborate upon (since information exchange is explicitly managed by a small known set of users, so even if conflicts occur, the users can work collaboratively to resolve the conflicts).

Most LOB systems do not employ optimistic offlining and concurrency models. LOB systems are masters (single masters) of the LOB data, and the actions that can be taken on the LOB systems are strictly controlled by business rules, not ad-hoc decisions of end-users. This is necessary since the accuracy and reliability of business data has direct influence on an enterprise's bottom line and can have legal/regulatory implications as well. Thus, the offline data synchronization when surfacing business data in office suite applications can be problematic.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a framework for surfacing line-of-business (LOB) system (a single master of data) actions and data inside a collaborative productivity tool (e.g., an office suite of applications), a multi-master of data.

In particular, the architecture provides a mechanism that allows an office suite user to access, manipulate, and share LOB entity information using collaborative means, while at the same time ensuring data and business process consistency for the LOB entity in the LOB system. The architecture blends the multi-master synchronization scenario of collaboration with the single-master synchronization scenario of business processes.

The architecture employs data storage on a client that stores hybrid forms and data, which is a user interface (UI) level composition of data on an LOB system and data on an office server (for collaboration using one or more office suite applications). The hybrid forms and data serve as a conduit between the LOB system and the office server.

A propagation component is provided that propagates changes in the hybrid forms and data in an office client to the LOB system and to the office server. Additionally, roaming delay optimizations are provided for a multi-client LOB server and multi-client office server. Conflict detection and resolution is also provided between user changes and LOB system changes, user changes and office service changes, and between clients that may conflict with each other.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

The disclosed architecture maintains the user experience when dealing with hybrid forms and hybrid data as close as possible to the user experience when dealing with the usual/regular forms and data provided in an office application.

Additionally, the architecture addresses synchronization of the hybrid data to single-master and multi-masters systems when the associated hybrid client goes offline, make changes to the hybrid data, and then come online. For example, where the single-master system is a line-of-business (LOB) server system and the multi-master system is an officer server that employs collaboration capability, the architecture allows office users to access, manipulate, and share LOB entity information using collaborative means, while at the same time, ensuring data and business process consistency for the LOB entity in the LOB system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
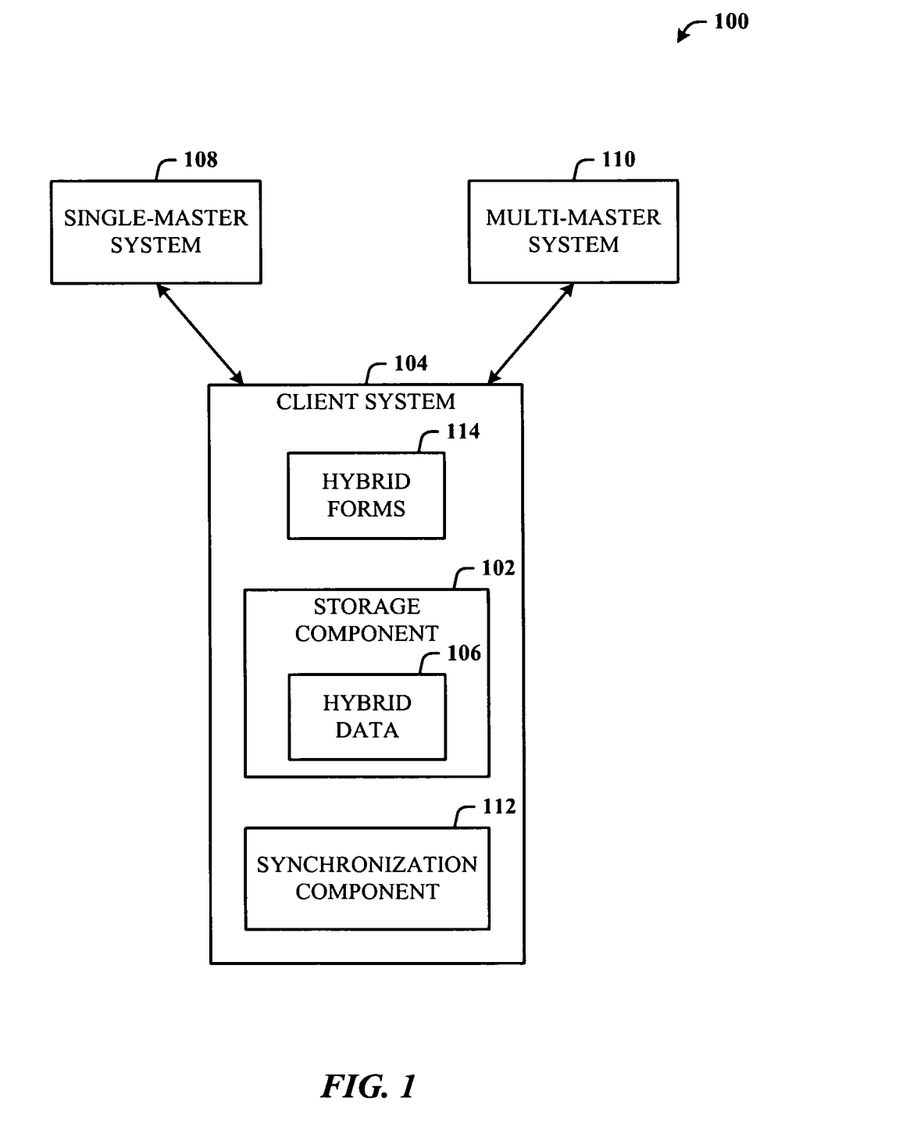
FIG. 1 illustrates a computer-implemented data system for hybrid data synchronization.

FIG. 1 illustrates a computer-implemented data system 100. The system 100 includes a storage component 102 of a client system 104 for storing hybrid data 106. The hybrid data 106 is associated with business entity information common to both a single-master system 108 and a multi-master system 110. The system 100 can also include a synchronization component 112 on the client system 104 for synchronizing the hybrid data 106 between the single-master system 108 and the client system 104 when the client system 104 returns to an online state. The client system 100 can also include hybrid forms 114 for user manipulation of native multi-master data (via a native office UI of a hybrid form), and hybrid data (single-master and multi-master data, via extensions to the native office UI).

The data synchronization system 100 disclosed herein is described in the context of a business server system as the single-master of business data and an office server system as the multi-master of office data. The business server system can be any business information (e.g., human resources, financials, etc.) that is a single-master system. The term "office" is intended to include one or more applications (which can be bundled as a suite) at least one of which facilitates collaboration between users and user systems.

As previously indicated and which will be described in greater detail herein, the single-master system 108 can be an LOB system and the multi-master system 110 is an office system, such that the hybrid data 106 includes office data and business data that are surfaced in an office-based user interface. The hybrid forms 114 are used for manipulating native multi-master data via a native user interface (UI) and manipulating the hybrid data 106 via extensions to the native UI.

The hybrid data 106 includes a data subset of multi-master data (referred to herein as PIM-subset data) associated with the multi-master system 110. The data subset is stored in the storage component 102 and also stored in a multi-master native storage. The hybrid data 106 also includes non-multi-master data (referred to herein as non-PIM biz data) that is stored only in the storage component.

The synchronization component 112 synchronizes the hybrid data 106 with a multi-master native storage. The synchronization component 112 also updates single-master data of the single-master system before updating multi-master data of the multi-master system.

The single-master LOB system is updated/changed first because these changes imply execution of code behind each property value being changed, that is, the changes trigger a business process. In general, business processes are not idempotent, in that the same operation cannot be performed twice and then expect to obtain identical results. However, for multi-master systems, the updates/changes exchanged between different clients of such system are property-bags of data. Setting the same field to the same values twice can be ignored. Reflecting every intermediate state that an object has gone through does not have to be reflected into a multi-master system, whereas the intermediate stages are reflected into the LOB/single-master system.

The synchronization component 112 concurrently synchronizes the storage component 102 to a native storage and to a single-master storage.

Figure 2:
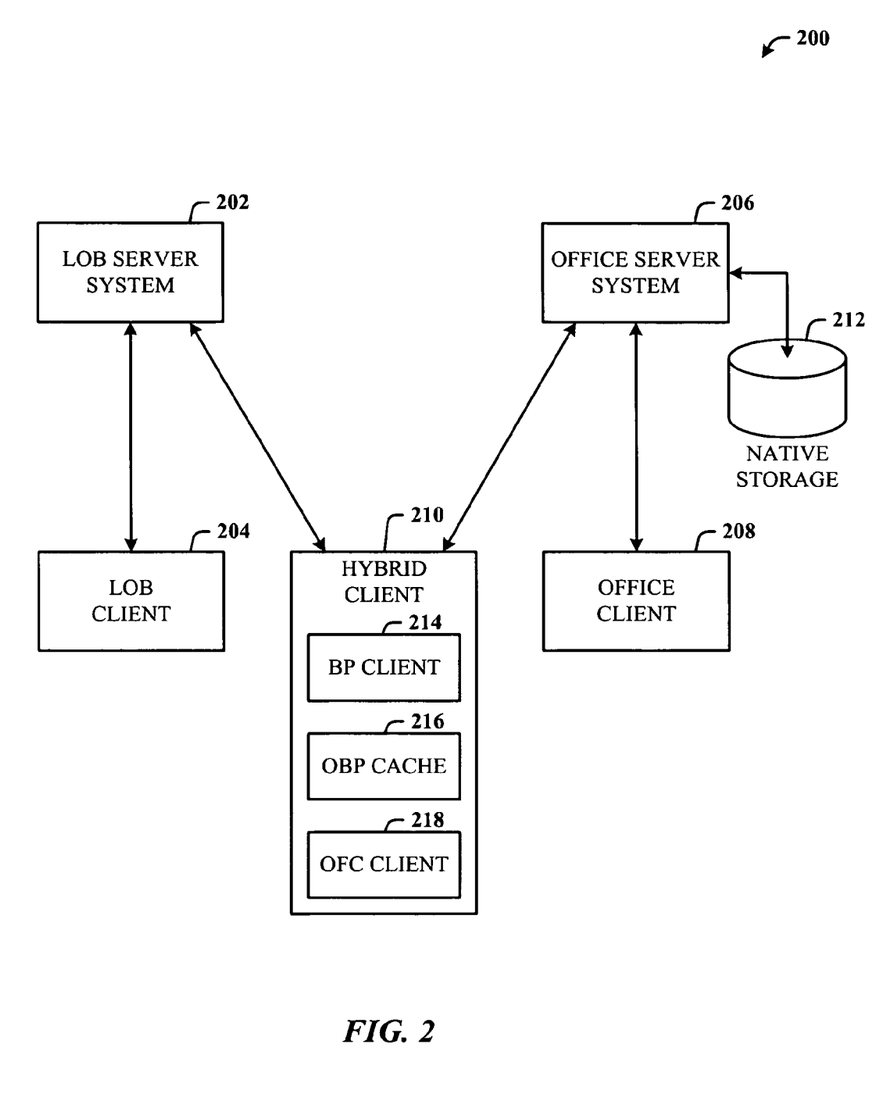
FIG. 2 illustrates a single-master/multi-master environment in which data synchronization from an offline state can be obtained.

FIG. 2 illustrates a single-master/multi-master environment 200 in which data synchronization from an offline state can be obtained. In the context of a business, the environment 200 can comprise an LOB server system 202 that is the master of business data and executes business processes. The LOB system 202 is the single master of data and can run business processes behind every data change. An LOB client 204 is a client that is aware of only the LOB system 202. The LOB client 204 can manipulate data only in the LOB system 202.

An office server system 206 is illustrated as the multi-master of office data which is accessible by an office client 208. The office client 208 is aware of only the office server system 206—not the LOB system 202. The office client 208 can manipulate the data in the office server system 206. For example, the office client 208 can be a personal information management (PIM) application and the office server system 206 can include an email server that processes at least email messages processed via the PIM application, a collaboration server, etc.

A hybrid client 210 includes the capability to interface to both the LOB server system 202 and the office server system 206. The hybrid client 210 communicates with the office system 206 to share information with other clients/users. Typically, this involves a native office storage 212 associated with the office system 206. The storage 212 can be an office application file that stores PIM application data, a word processor document, a spreadsheet document, etc., where the office application can operate in an offline mode from the office system 206.

The hybrid client 210 can be employed on a client machine that can go offline from the LOB system 202 and/or the office system 206. The hybrid client machine can be a portable computer running an office suite of applications, which machine can be online while at work or offline during home use or travel, for example.

The description processed under an assumption that the hybrid client 210 is running a business platform (BP) client 214, and that the BP client 214 maintains an OBP (office business platform) client cache 216 of information in which store the data obtained from the LOB system 202. The hybrid client 210 also includes an office (OFC) client 218 for interfacing to the office system 206. The OBP cache 216 allows the OFC client 218 to work offline from the LOB system 202. An office user interface (UI) of the hybrid client 210 works with the assumption that the business data is stored/manipulated in the OBP cache 216, and that the manipulation of business data also generates operations that are be queued up (in the order the operations were initiated) in the OBP cache 216 (along with the data). When the OFC client 218 is connected and online with to LOB system 202, the data and operations in the OBP cache 216 are synchronized to the LOB system 202.

The environment 200 provides a seamless user experience between the connected/online and disconnected/offline operations of the hybrid client 210. When offline, the BP client 214 will have a pending list of data and operation changes that have yet to be synchronized with the LOB system 202. However, the for the user perspective, nothing is different, since work via an application UI is not dependent on whether the client is offline or online. This status is below the application level and can be visible as additional status-information in the BP client 214. Additionally, the hybrid client developer does not need to include different business logic that depends on whether the hybrid client 210 is online or offline.

In that the hybrid client 210 can interact with the LOB system 202 and the office system 206, the hybrid client 210 can maintain references to the related office system items inside an LOB system item and can also maintain references to the related LOB system items inside an office system item. The hybrid client 210 is the only client in the illustrated environment 200 that can operate back and forth by traversing these references.

The hybrid client 210 does not keep any additional data on a client machine that is not already in the LOB system 202 or the office system 206 or some other service the hybrid client 210 invokes. However, it is to be understood that the hybrid client 210 can maintain a hybrid cache (not shown) of this data for performance reasons, as well as for offline access. Additionally, the hybrid client 210 executes operations on the LOB system 202 and/or the office system 206, since these systems (202 and 206) are the systems that own and manage the physical data.

Figure 3:
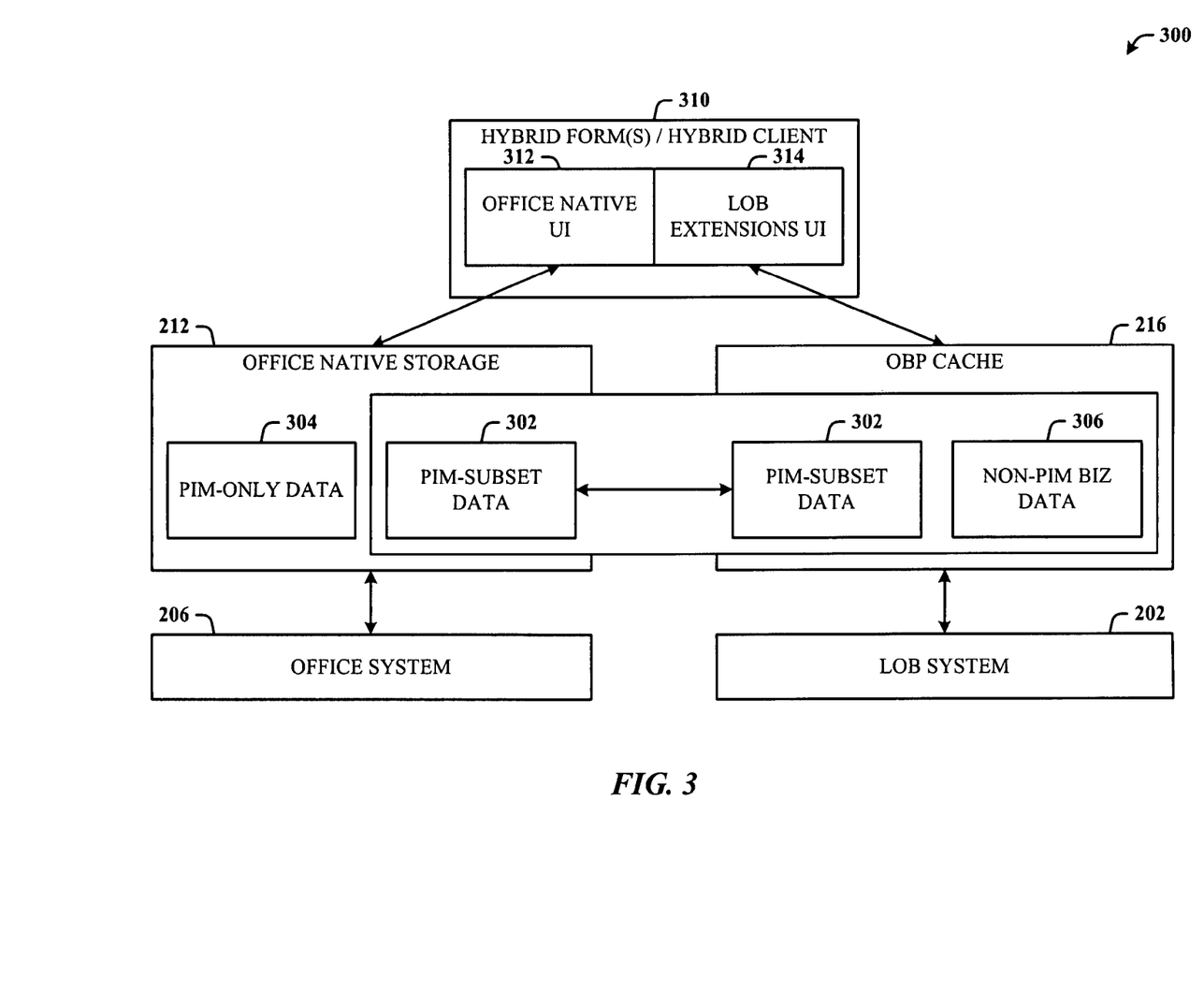
FIG. 3 illustrates a hybrid data model application pattern with data types.

FIG. 3 illustrates a hybrid data model 300 application pattern with data types. There are three distinct pieces of data: LOB business ("biz") data, office system (PIM-subset) data 302, and PIM-only data 304. The LOB business data is the business data in the LOB system 202. The office system PIM-subset data 302 is the portion of business data that also lives in the office server system 206. Examples of the PIM-subset data 302 include the start-time of an appointment mapped to an LOB Time Entry entity Begin property.

Other types of business data include non-PIM biz data 306, which is the data remaining after removing the PIM-only data 304 from the LOB business data. In other words, the non-PIM biz data 306 is the data not mapped to any office system portion, and is LOB-only data. An example of the LOB-only data (non-PIM biz data 306) can be the code of an LOB Time Entry entity, which is something the LOB system 202 cares about, but is not relevant to office system 206. The PIM-subset data 302 and non-PIM biz data 306 are shown as the hybrid data stored in the OBP cache 216 and the office native storage 212.

The PIM-only data 304 is data that exists in the office system 206 only and is not mapped to anything in the LOB system 202. Examples of PIM-only data 304 can be an Appointment Color, Follow-up Flag, and other properties that the LOB system 202 does not care about.

The following table summarizes the data types and data mappings. For example, the PIM-subset data 302 is accessible by the LOB system 202, LOB client, hybrid client, office system 206, and office client. In contrast, the PIM-only data 304 is accessible only by the hybrid client, office server system 206, and office client.

| Module/Data | LOB System | LOB Client | Hybrid Client | Office System | Office Client |
| --- | --- | --- | --- | --- | --- |
| PIM-Subset Data | X | X | X | X | X |
| Non-PIM Biz Data | X | X | X | | |
| PIM-Only Data | | | X | X | X |

The hybrid data model 300 shows that the hybrid client includes a hybrid form 310 that present office system data and LOB system data. The office data is viewable via an office native UI 312 and the LOB data is viewable via an LOB extension UI 314.

The hybrid forms (and hybrid data) 310 serve as a conduit between the office system 206 and the LOB system 202. Hybrid data can be defined for an LOB entity that allows some of the business information within the entity to be accessible to the office application's native UI 312 that may not understand the entire business information or business process. The hybrid data includes the office native portion (PIM-subset data 302) that does not have business semantics (no business processes execute when this data changes and the PIM-subset data 302 is independent of any other data in the system). The hybrid data also includes the rest of the business information (non-PIM biz data 306), which does not intersect (there are no shared fields) with the PIM-subset data 302. The non-PIM biz data 306 has business semantics, dependencies with other business data in the hybrid client or the LOB system 202, etc. The entire data for the LOB entity is a union of the PIM-subset data 302 and the non-PIM biz data 306.

The hybrid data for the LOB entity can be stored in both the office native storage 212 and the OBP client cache 216 of business information. More specifically, the PIM-subset data 302 is stored in both the office native storage 212, as well as the OBP client cache 216, and the non-PIM biz data 306 is only stored in the OBP client cache 216 (and not in the office native storage 212).

The hybrid form 310 can be defined to include the native office UI 312 that allows the user to manipulate the native office information. The native office information is the union of the PIM-subset data 302 of the business information, as well as the PIM-only data 304 that lives only in the office server system 206. The extensions to the office UI 314 allow the user to manipulate business information that lives in a LOB system 202, the business information that comprises the union of the PIM-subset data 302 and the non-PIM biz data 306.

The hybrid form 310 that contains the hybrid data can be populated (read) by populating the office native UI 312 from the PIM-subset data 302 and PIM-only data 304 in the native office storage 212(not the data in the OBP client cache 216), and by populating the business extensions UI 314 to the office object from the OBP client cache 216 (the non-PIM biz data 306).

The hybrid form 310 that contains the hybrid data can be saved (a write) by mapping/assigning the PIM-only data 304 only to the native office storage 212, but mapping/assigning the PIM-subset 302 to both the native office storage 212 and the OBP client cache 216, in addition to, from the office extended UI 314, mapping/assigning the non-PIM biz data 306 to the OBP client cache 216.

The writes to the OBP client cache 216 can be performed for both the PIM-subset data 302 and the non-PIM biz data in a single atomic transaction. This write is performed first. The write to the native office storage 212 for the PIM-only data 304 and the PIM-subset data 302 can also be performed in a single atomic transaction, but after the writes to the OBP client cache 216 above complete successfully. If the write to the native office storage 212 fails, but the writes to the OBP client cache 216 succeed, synchronization of the native office storage 212 with the OBP cache 216 is performed by updating all aggregated the LOB entity instances, in memory in a single atomic transaction into the OBP client cache 216.

With respect to hybrid client synchronization, changes of hybrid data can be propagated via hybrid forms on the hybrid client to the LOB system 202 and to the office system 206. The OBP cache 216 ↔ LOB system 202 synchronization process understands the hybrid data compositions described above. When the hybrid client improves synchronization of the LOB entity data with the LOB system 202, the hybrid data and hybrid forms model reaps all the benefits. Nothing needs to be changed in the application UI or data storage/forms model. The identification is accomplished as follows.

All the changes to each LOB entity instance in various UI artifacts are aggregated within a hybrid form. In other words, each UI artifact in the hybrid form (e.g., a control, a task pane, a button, etc.) does not independently update different parts of the LOB entity instance in the OBP client cache 216. All changes are first aggregated in memory in the first phase. Note that this aggregation can collect both PIM-subset and non-PIM biz data changes to make hybrid client think that a single end-user action is updating the LOB entity instance, and not a series of end-user actions that need to be aggregated. This is performed because, unless the aggregation is done in the hybrid form, the OBP client cache 216 will simply see disjoint, individual UI artifact-driven changes to the underlying LOB business entity, and will not know how to group/draw a boundary around these changes (and data consistency cannot be ensured).

All the aggregated LOB entity instances can be updated in memory in a single atomic transaction into the OBP client cache 216. Once the grouping/aggregation of changes is done, in-memory copies of the LOB entity instances can then be updated in the OBP client cache 216 in the second phase and in a consistent manner. In other words, the ability to aggregate on a per-entity-instance level and the ability to update the aggregated entities into the OBP client cache 216 helps the OBP cache 216↔ LOB system 202 synchronization process work on hybrid data in exactly the same way as regular data.

In a concurrent manner with the OBP cache/LOB system synchronization process, an OBP cache 216↔ office native storage 212 synchronization process can occur. The OBP cache 216↔ office native storage 212 synchronization process understands the hybrid data composition described above. When the hybrid client improves how the native office storage 212 is synchronized with the OBP client cache 216, the hybrid data and hybrid forms model reaps all the benefits without any other change. The identification is accomplished follows.

The LOB entity instance ID (identifier) is stored as part of the PIM-subset of each LOB entity that is being updated by a given hybrid form. These IDs allow the hybrid form being launched from the native office storage 212 (that can see only the PIM-subset data 302 by definition above) to retrieve the non-PIM biz data 306 by accessing the OBP client cache 216.

A hash-code for the PIM-subset of each LOB entity that is being updated can be stored by a given hybrid form. The hash-code is a "digital signature" of the PIM-subset.

The hybrid form updates the hash-code for the PIM-subset whenever the hybrid form is written. Only the hybrid form that knows how to write to both the office native storage 212 and the OBP client cache 216 will know how to update the hash-code. If the PIM-subset 302 in the native office store 212 is updated without using hybrid forms (e.g., in the native office UI 312 on a non-OBP client), then the hash-code will not match the change to the property values.

The native office storage 212→OBP cache 216 synchronization process can ignore changes to the PIM-subset done by hybrid forms (where the hash-code matches), and instead, waits for the LOB→OBP cache synchronization to roam the PIM-subset through the LOB system 202. This is because, if the PIM-subset change cannot be identified as coming in from a hybrid form update, the hybrid form update could be sent to the LOB system 202 twice—once after the write mention above, and once when the office native storage 212→OBP cache 216 synchronization initiates. This could create duplicates or create data inconsistencies in the LOB system 202.

The native office storage 212→OBP cache 216 synchronization can absorb changes to the PIM-subset done by non-hybrid client aware office clients (that do not understand hybrid forms). This maintains the user-experience in non-OBP aware office clients and provides interoperability with OBP-aware office clients.

The OBP cache 216→native office storage 212 synchronization can update the LOB entity instance ID and hash-code in the PIM-subset within the native office storage 212 for every LOB entity instance that is being synchronized from the OBP client cache 216 into the native office storage 212. This ensures that whenever the OBP cache 216 is updated, and the PIM-subset properties are updated, the identifying pieces, namely, the ID and hash-code, are also updated. This is because, if the ID is not updated, it will not be known how to get back to the non-PIM biz data that corresponds to the PIM-subset. If the hash-code is not updated, it could be thought that the change came from a non-OBP aware office client (and not from the LOB system 202 or via a hybrid form). The change will then be resubmitted back to the LOB system 202 creating duplicates or data inconsistencies.

With respect to multi-client LOB server 202 roaming delay optimization, since the hybrid data storage essentially stores the LOB entity business data in two places—the office native store 212 connected to the office system 206 (PIM-only+PIM-subset); and the OBP cache 216 connected to the LOB system 202 (PIM-subset+non-PIM biz data)—it is possible that the non-PIM biz data may roam slower from one OBP client to another, compared to the PIM-subset.

The system can indicate to the user that there is a "synchronization delay" whenever the hash-code of the PIM-subset in the native office storage 212 does not match the hash-code of the PIM-subset in the OBP client cache 216. This lets the user know that the office object in question is not in a consistent or fully-synchronized state. Office applications can then block changes to objects that are not in the fully-synchronized state.

The LOB→OBP cache synchronization can include an optimization to pull-in the changes to those LOB entity instances whose PIM-subset hash-code in the native office storage 212 does not match the PIM-subset hash-code in the local OBP cache 216 (but the hash-codes match the property values in the corresponding PIM-subsets). These are exactly those items that were modified by either hybrid forms or by the LOB→OBP Cache Synchronization on a different OBP client, but the changes have not migrated via the LOB system 206 into this OBP client.

The LOB→OBP cache synchronization can include an optimization to pull-in the full data of the LOB entity instances having entity instance IDs (part of the PIM-subset) that cannot match any entity instance ID in the local OBP client cache 216. This is a Create of an item in a different OBP client via a hybrid form, and this new entity is never seen by the local OBP cache 216.

With respect to multi-client office system 206 roaming delay optimization, this is the opposite case of the LOB system 202 roaming delay optimization. With the hybrid model, the OBA client writes to both the office system 206 server and the LOB system 202. It is possible that the LOB system 202 can be faster than the office system 206, which means that out of the changes written by one OBA client, the non-PIM biz data 306 changes can appear at another OBA client before the PIM-subset changes. In practice, this can happen because the office system 206 was down for maintenance or otherwise unavailable, but the LOB system 202 was available, for example.

An interesting aspect of this reverse behavior is that OBA clients write to the OBP cache 216 first within a transaction. Thus, even if there is a failure, the PIM-subset can be "hydrated" into the office system 206 subsequently by relying on the OBP client cache 216 (since the PIM-subset was updated first in the OBP cache 216 within a transaction). Thus, if the LOB data roams faster from an OBA client "A" to another OBA client "B", then since the whole PIM-subset is part of the business data anyway, OBA client B already has the full business data and is up to date: only the native office client C (that is on the same machine as client B, and does not have access to the OBP client cache 216 like client B) does not see the PIM-subset—client C connects to the office native storage 212 to see the PIM-subset.

This can be true, except for two cases. In a first case, processing "Creates" on OBA client B where the non-PIM biz data roams faster from client A to client B—the client B sends the create to the office system 206, rather than processing this as an LOB-initiated create; otherwise, duplicate items will be created as soon as client A is able to synchronize back to the office system 206. In a second case, when processing PIM-only data during Creates, the PIM-only data cannot be recovered from the LOB business data. This leads to the following.

The OBA client synchronizes Creates into the office system 206 only when the client is online with the office system 206 or the client has a token to do so. The online presence or an explicit token (marked as "OFC Server Update Arbitration" in FIG. 4) is utilized so that duplicate creates do not get sent to the office system 206. The token itself can be obtained using standard protocols: however, the token is used before the synchronization to the office system 206. The token can be granular to the level of the individual item being changed, or for changing all items in a particular folder or view, or for changing any item in the office system 206.

The OBA client does not write PIM-subset information to the office system storage 212 during a Create operation that does not also add PIM-only data to the item being created. This works because the PIM-subset is mapped and stored within the LOB business data, and roams with the LOB business data from client A to client B. Thus, in the corner case described above, if client B has the token to update the office system 206, client B can send a create operation to the office system 206 (while client A is still disconnected from the office system 206). When client A goes online to connect to the office system 206, client A will find that the item has already been created, and will not issue the duplicate create.

The capability for the OBA client to detect that PIM-only data 304 is added during a Create operation, and in this case, if the OBA client does not have the office system token (or is offline from the office system 206), the Create is disabled with the PIM-only data 304. In this case, the user creates the item without any PIM-only data, waits for the client that has the office system token to update the office system 206, and then adds the PIM-only data 304 to that item. This is a different user-experience than creating regular (non-LOB bound) offline PIM items with a follow-up flag.

Ways in which to mitigate this include explicitly roaming even PIM-only data via the LOB system 202. In other words, PIM-only is converted to PIM-subset data. This mitigation technique is not a general purpose solution and may not be acceptable due to security, bloat, etc.

Another mitigation technique includes providing a quick way to obtain the office system update token. In other words, a token can be created per item in the office system 206; the creator of the item has the token for it. Thus, if OBA client A created the item, client A holds on to the token for client A, and client B never hydrates the Create initiated by client A into the office system 206. Token management includes maintaining not just which client (A or B) is allowed to update the office system 206, but also which items in the office system 206.

With respect to conflict detection and resolution, the mechanisms provided by the hybrid client and the office system can be leveraged to detect and resolve conflicts between user changes and LOB system changes, user changes and office system changes, and two users/clients that conflict with each other.

With hybrid forms and hybrid data, a discrepancy between the hybrid client and the office system 206 can be that the PIM-subset data 302 can have conflicts detected and managed without involving the LOB system 202, and the non-PIM biz data 306 can have conflicts detected and managed without involving the office server system 206. This is based on the PIM-subset data 302 and the non-PIM biz data 306 being completely non-intersecting from a physical and a logical sense (changes occur completely independently, as long as the changes to each can be detected, and the synchronization logic between PIM-subset data 302 and the non-PIM biz data 306 can be executed on the office client).

Figure 4:
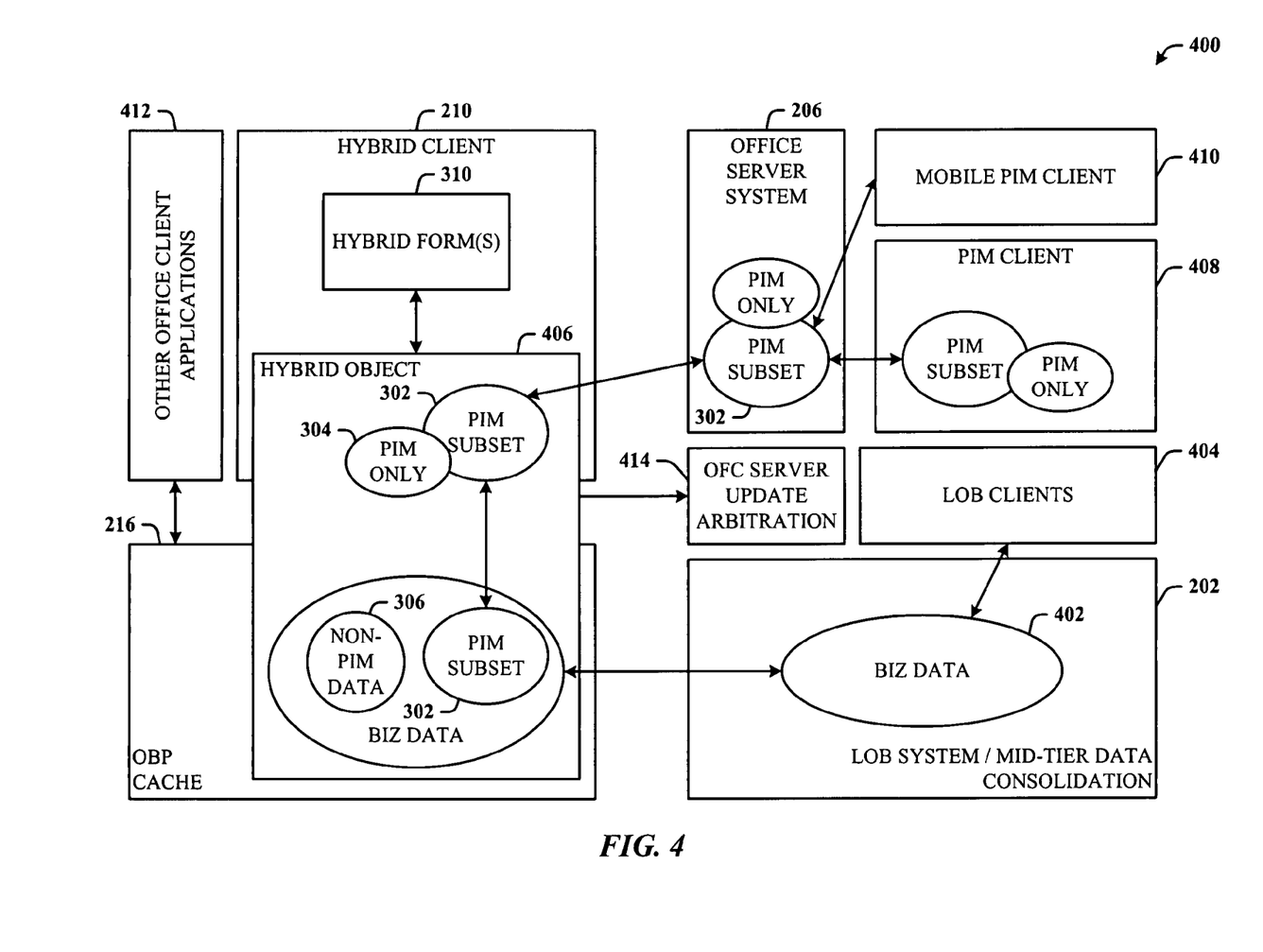
FIG. 4 illustrates another representation of data types in a system for single-master and multi-master synchronization.

FIG. 4 illustrates another representation of data types in a system 400 for single-master and multi-master synchronization. This particular description will include reference to actual products that can benefit from the disclosed synchronization architecture. The system 400 includes the single-master LOB system 202 as a mid-tier system for data consolidation. The LOB system 202 includes LOB business ("biz") data 402, which is exposed not only to LOB clients 404 (e.g., LOB client 204 of FIG. 2) but also to the hybrid client 210 (e.g., Outlook™, a PIM application by Microsoft Corporation working in conjunction with Exchange Server™ by Microsoft Corporation, as the multi-master of data). The hybrid client 210 processes the hybrid form(s) 310 one of which is associated with a hybrid object 406 that exposes office data and LOB data. For example, the hybrid object 406 pulls portions of the biz data 402 into the OBP cache 216, which portions include the PIM-subset 302 and non-PIM data 306.

The cache 216 can also store the PIM-only data 304 which the client user can change, and which updates can be synchronized to the office server system 206 along with the PIM-subset data 302. Once synchronized to the office system 206, a standard PIM client 408 can then interact with the PIM-subset data 302 and PIM-only data 304 of the office system 206. In reverse, changes made by the standard PIM client 408 are uploaded to the office system 206 for synchronization to the hybrid client 210. Similarly, a mobile PIM client 410 can also interact with the PIM-subset data 302 of the office system 206. Other office client applications 412 can access the OBP cache 216 for PIM-only data.

In other words, the office system 206 offers support for multiple-masters of data. Each of the other office client applications 412 (and hybrid client 210) can update an item in the office system 206, or collaborate on changing the item. Here, changing an item does not automatically involve running additional code behind the item, since there is no automatic side-effect (on that or other items) as a result of changing an item. Each change to an item is complete and consistent, unlike in the LOB system 202, where each change necessarily has side-effects and is necessarily not complete as is. This difference (from conventional systems) is exploited in the disclose architecture. The core design is that the single-master data is changed first, followed by changes to the multi-master data. In other words, the single-master change is the "head/source" of the change, with the multi-master change is the "tail/sink" of the change. This works because the store that runs the code behind each change has the chance to run that code first. The store that changes only store data changes, distributes the changes, and consolidates the changes without custom code at each step, is executed subsequently. Data update arbitration can be provided by an office server system update arbitration component 414.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
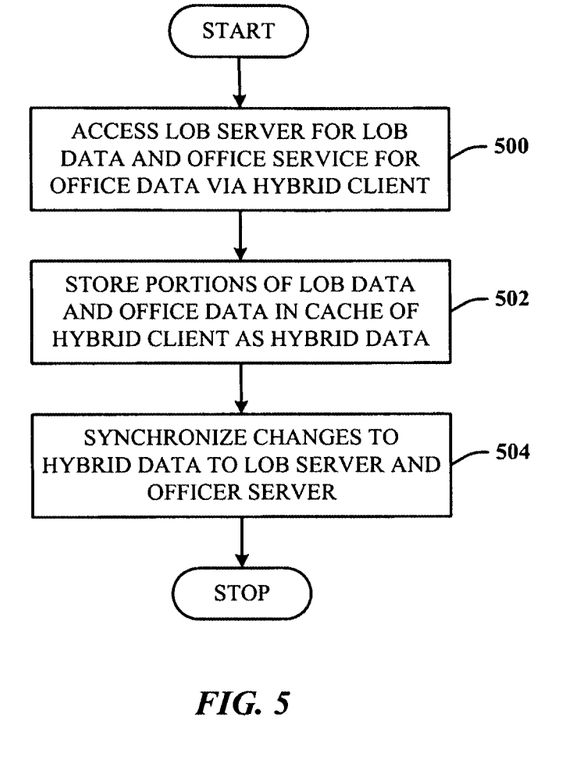
FIG. 5 illustrates a computer-implemented method.

FIG. 5 illustrates a computer-implemented method. At 500, an LOB server for LOB data and an office server for office data are accessed via a hybrid client. At 502, portions (e.g., subsets) of the LOB data (e.g., non-PIM biz data) and the office data (e.g., PIM-subset data) are stored in a cache of the hybrid client as hybrid data. At 504, changes to the hybrid data are synchronized to the LOB server and the office server.

The method can further include surfacing the hybrid data via a hybrid form as presented in a UI (office native) of the hybrid client, which is a personal information management (PIM) client, populating the hybrid form with office information via a native UI that exposes the portion of the office data and office-only data of an office native storage, and populating the hybrid form with business information via a business extensions UI that exposes the portion of the office data and business-only data (e.g., non-PIM biz data) of the LOB server.

The method can also include sending a notification in response to delayed synchronization of the changes between the cache and the LOB server. Changes to each LOB entity instance can be aggregated and the aggregated LOB entity instances updated in a single atomic transaction to the hybrid client.

Figure 6:
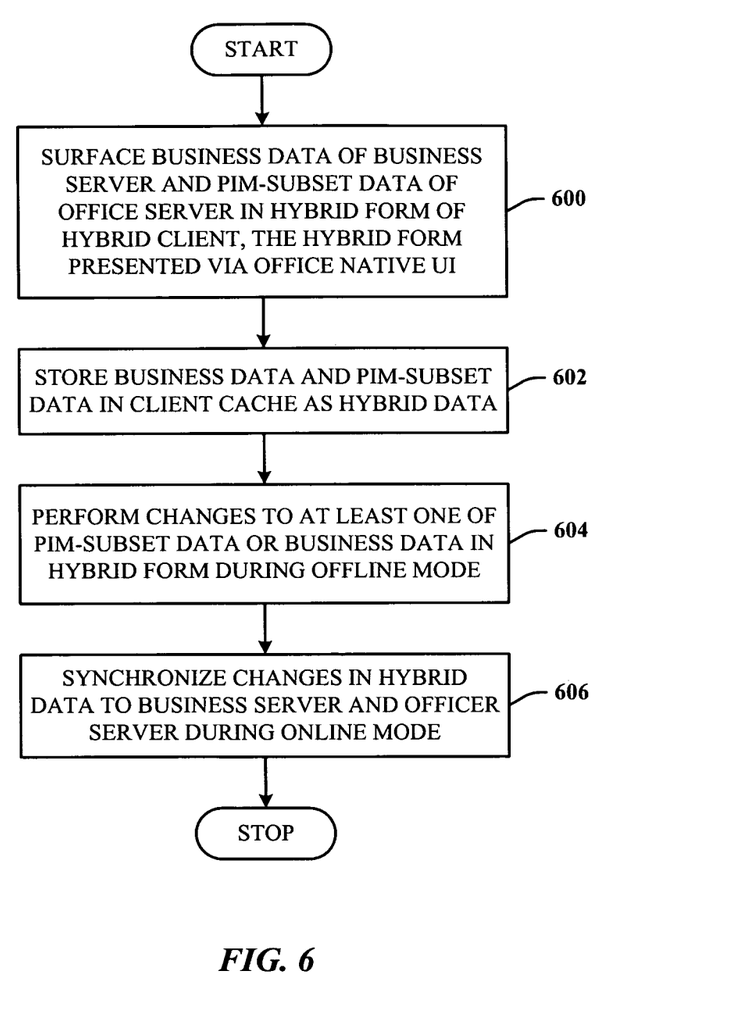
FIG. 6 illustrates a computer-implemented method of processing data in a hybrid environment.

FIG. 6 illustrates a computer-implemented method of processing data in a hybrid environment. At 600, business data (e.g., non-PIM biz data) of a business server (e.g., LOB system) and PIM-subset data of an office server are surfaced in a hybrid form of a hybrid client, the hybrid form presented via an office native UI. At 602, the business data and the PIM-subset data are stored in a client cache as hybrid data. At 604, changes are performed to at least one of the PIM-subset data or the business data in the hybrid form during an offline mode. At 606, the changes in the hybrid data are synchronized to the business server and the office server during an online mode.

The method can further include storing the business data and the PIM-subset data to the client cache in a single atomic transaction before writing to the office server. The synchronization of creates from the hybrid client to the office server can be managed based on a token. From the native office UI, the PIM-subset data can be mapped to the client cache and a native storage of the office server, and the business data can be mapped to the client cache. Additionally, the PIM-subset data and the business data are non-intersecting physically and logically.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
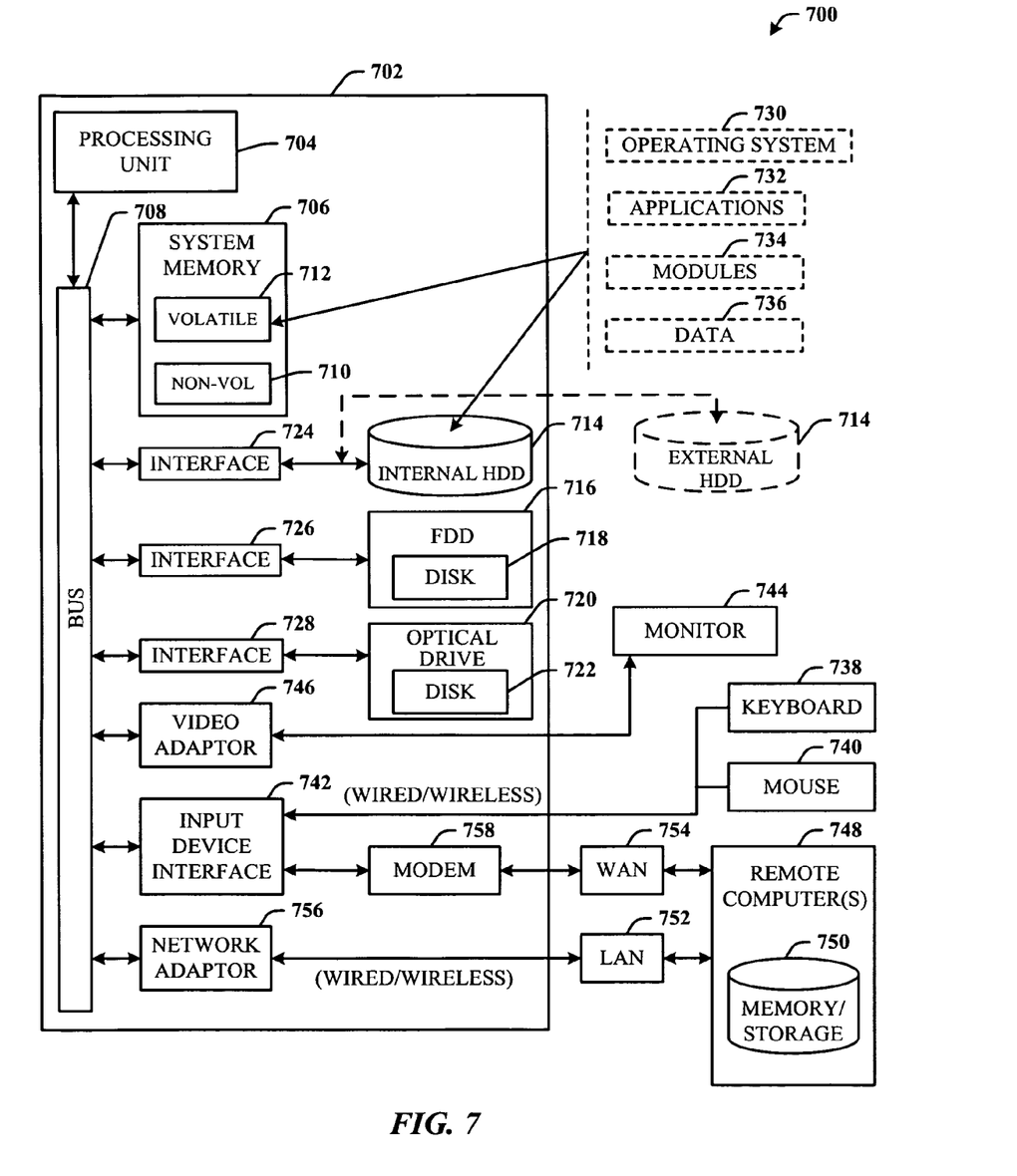
FIG. 7 illustrates a block diagram of a computing system operable to execute a hybrid client and synchronization in accordance with the disclosed architecture.

Referring now to FIG. 7, there is illustrated a block diagram of a computing system 700 operable to execute a hybrid client and synchronization in accordance with the disclosed architecture. In order to provide additional context for various aspects thereof, FIG. 7 and the following discussion are intended to provide a brief, general description of a suitable computing system 700 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 7, the exemplary computing system 700 for implementing various aspects includes a computer 702 having a processing unit 704, a system memory 706 and a system bus 708. The system bus 708 provides an interface for system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 can include non-volatile memory (NON-VOL) 710 and/or volatile memory 712 (e.g., random access memory (RAM)). A basic input/output system (BIOS) can be stored in the non-volatile memory 710 (e.g., ROM, EPROM, EEPROM, etc.), which BIOS are the basic routines that help to transfer information between elements within the computer 702, such as during start-up. The volatile memory 712 can also include a high-speed RAM such as static RAM for caching data.

The computer 702 further includes an internal hard disk drive (HDD) 714 (e.g., EIDE, SATA), which internal HDD 714 may also be configured for external use in a suitable chassis, a magnetic floppy disk drive (FDD) 716, (e.g., to read from or write to a removable diskette 718) and an optical disk drive 720, (e.g., reading a CD-ROM disk 722 or, to read from or write to other high capacity optical media such as a DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 712, including an operating system 730, one or more application programs 732, other program modules 734, and program data 736. The one or more application programs 732, other program modules 734, and program data 736 can include the client system 104, storage component 102, hybrid data 106, synchronization component 112, hybrid forms 114, hybrid client 210, BP client 214, OBP client 216, OFC client 218, the PIM-subset data 302, PIM-only data 304, non-PIM biz data 306, hybrid forms 310, office native UI 312, LOB extension UI 314, for example.

All or portions of the operating system, applications, modules, and/or data can also be cached in the volatile memory 712. It is to be appreciated that the disclosed architecture can be implemented with various commercially available operating systems or combinations of operating systems.

A user can enter commands and information into the computer 702 through one or more wire/wireless input devices, for example, a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, etc.

A monitor 744 or other type of display device is also connected to the system bus 708 via an interface, such as a video adaptor 746. In addition to the monitor 744, a computer typically includes other peripheral output devices (not shown), such as speakers, printers, etc.

The computer 702 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, is connected to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
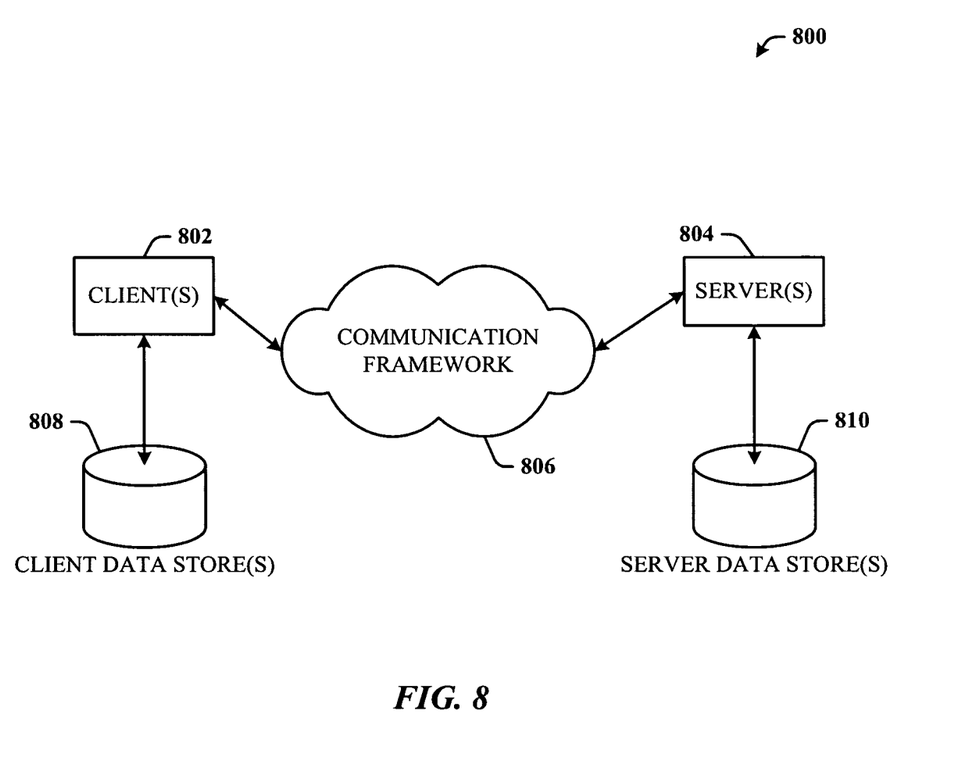
FIG. 8 illustrates a schematic block diagram of an exemplary computing environment for single-master and multi-master data processing and synchronization.

Referring now to FIG. 8, there is illustrated a schematic block diagram of an exemplary computing environment 800 for single-master and multi-master data processing and synchronization. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

The client(s) 802 can include the client system 104, hybrid client 210, office client 208, LOB client 204, LOB clients 404, PIM client 408, mobile PIM client 410, and other office client applications 412, for example. The server(s) 804 can include the single-master system 108, the multi-master system 110, the LOB server system 202, and the office server system 206 (and associated native storage 212), for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
a hybrid client for online and offline manipulating hybrid data and for interfacing with both a single-master system for implementing business processes and a multi-master system comprising a suite of applications for facilitating collaboration between users and user systems, the hybrid client further comprising a single-master client component including a client cache for storing data obtained from the single-master system and working offline from the single-master system, and a multi-master client component for interfacing to the multi-master system;
a storage component of the hybrid client for storing the hybrid data, the hybrid data associated with a single-master data entity common to both the single-master system and the multi-master system;
a synchronization component of the hybrid client for synchronizing changes made offline to the hybrid data between the single-master system and the hybrid client when the hybrid client returns to an online state; and
a processor that executes computer-executable instructions associated with at least one of the storage component or the synchronization component.

2. The system of claim 1, wherein the single-master system is a line-of-business (LOB) system and the multi-master system is an office system, the hybrid data including office data and business data that are surfaced in an office-based user interface.

3. The system of claim 1, further comprising a hybrid form for manipulating native multi-master data via a native user interface (UI) and manipulating the hybrid data via extensions to the native UI.

4. The system of claim 1, wherein the hybrid data includes a data subset of multi-master data associated with the multi-master system, the data subset is stored in the storage component and also stored in a multi-master native storage.

5. The system of claim 1, wherein the hybrid data includes a non-multi-master data that is stored only in the storage component.

6. The system of claim 1, wherein the synchronization component synchronizes the hybrid data with a multi-master native storage.

7. The system of claim 1, wherein the synchronization component updates single-master data of the single-master system before updating multi-master data of the multi-master system due to the single-master data triggering a business process.

8. The system of claim 1, wherein the synchronization component concurrently synchronizes the storage component to a native storage and to a single-master storage.

9. A computer-implemented method, comprising acts of:
accessing an LOB server for LOB data and an office server comprising a suite of applications for facilitating collaboration between users and user systems, for office data via a hybrid client including an LOB client component and an office client component; storing portions of the LOB data and the office data in a cache of the LOB client component of the hybrid client as hybrid data; synchronizing changes to the hybrid data to the LOB server and the office server during an online mode based on the changes to the hybrid data made in an offline mode; updating an LOB entity instance identifier and hash code in the portion of office data stored in a native storage in response to the LOB entity instance being synchronized from the cache to the office server; and utilizing a processor that executes instructions stored in memory to perform at least one of the acts of accessing, storing, or synchronizing.

10. The method of claim 9, further comprising surfacing the hybrid data via a hybrid form as presented in a UI of the hybrid client, which is a personal information management (PIM) client.

11. The method of claim 10, further comprising:
populating the hybrid form with office information via a native UI that exposes the portion of the office data and office-only data of an office native storage; and
populating the hybrid form with business information via a business extensions UI that exposes the portion of the office data and business-only data of the LOB server.

12. The method of claim 9, further comprising sending a notification in response to delayed synchronization of the changes between the cache and the LOB server.

13. The method of claim 9, further comprising aggregating the changes to each LOB entity instance and updating the aggregated LOB entity instances in a single atomic transaction to the hybrid client.

14. The method of claim 9, further comprising:
storing LOB entity instance identifiers as part of the portion of office data for each LOB entity being changed by a hybrid form;
storing the hash code of the portion of office data for each LOB entity being changed by the hybrid form; and
updating the hash code of the portion of office data when the hybrid form is written.

15. The method of claim 9, further comprising concurrently synchronizing to the native storage and to a single-master storage.

16. A computer-implemented method, comprising acts of:
surfacing business data of a business server and PIM-subset data of an office server in a hybrid form of a hybrid client having a business client component for implementing business processes and an office client component for implementing a suite of applications that facilitate collaboration between users and user systems, the hybrid form presented via an office native UI;
storing the business data and the PIM-subset data in a client cache as hybrid data;
performing changes to at least one of the PIM-subset data or the business data in the hybrid form during an offline mode;
synchronizing the changes in the hybrid data to the business server and the office server during an online mode; and
utilizing a processor that executes instructions stored in memory to perform at least one of the acts of surfacing, storing, or performing.

17. The method of claim 16, further comprising storing the business data and the PIM-subset data to the client cache in a single atomic transaction before writing to the office server.

18. The method of claim 16, further comprising managing synchronization of creates from the hybrid client to the office server based on a token.

19. The method of claim 16, wherein the PIM-subset data and the business data are non-intersecting physically and logically.

20. The method of claim 16, from the native office UI, further comprising mapping the PIM-subset data to the client cache and a native storage of the office server, and mapping the business data to the client cache.

\* \* \* \* \*